UNITED STATES PATENT OFFICE.

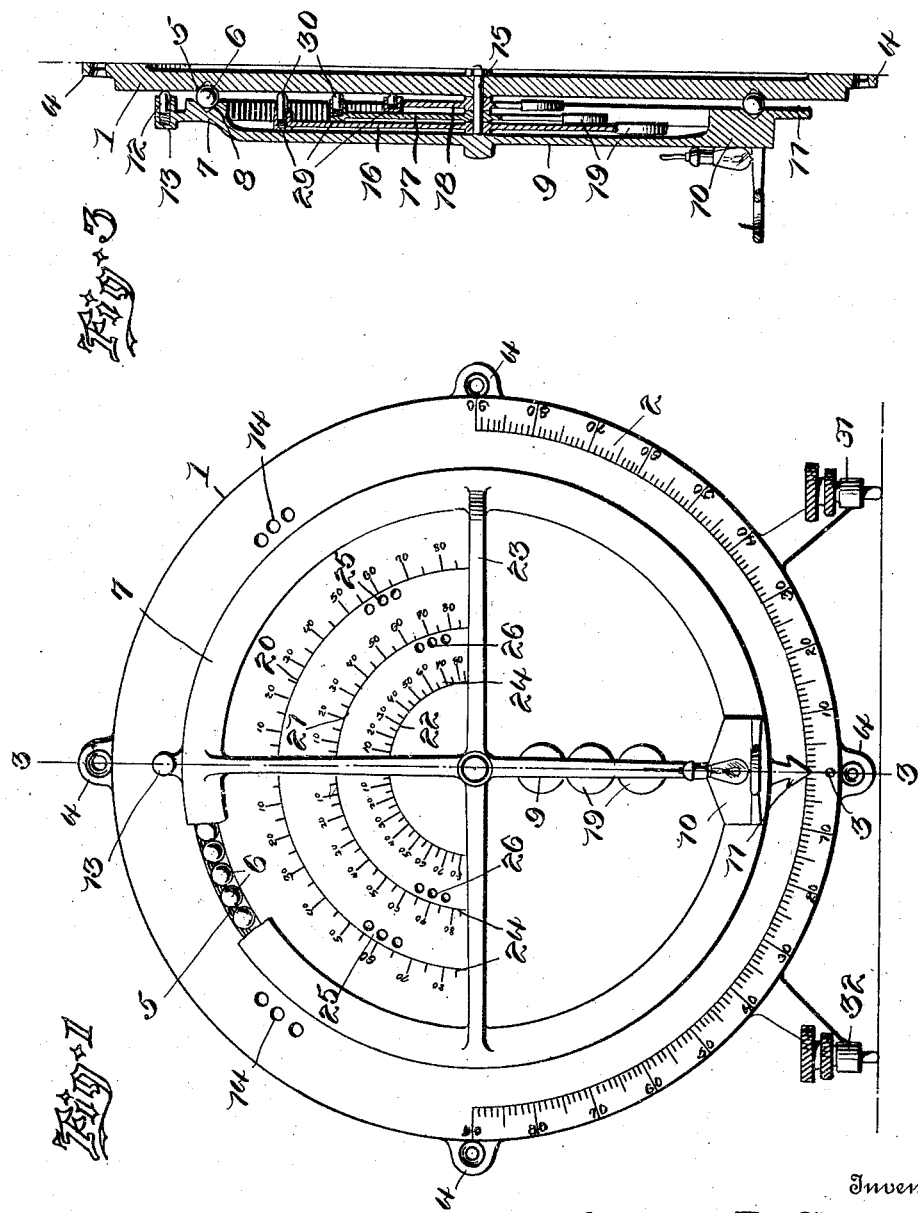

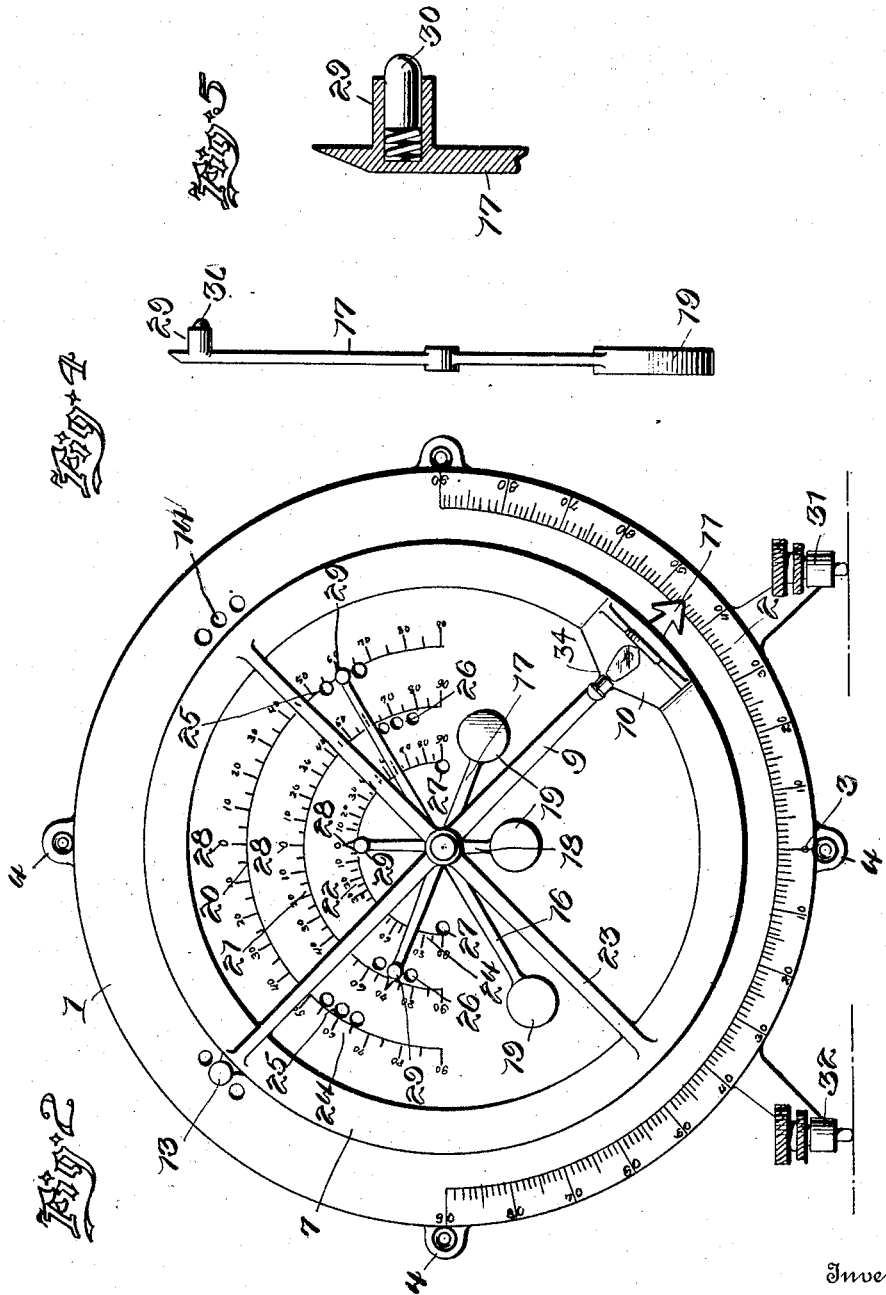

OSCAR ROBT. CASSELL, OF NEW YORK, N. Y.

ANGLE-INDICATOR.

1,038,291.

Specification of Letters Patent. Patented Sept. 10, 1912.

Application filed May 10, 1911. Serial No. 626,357.

*To all whom it may concern:*

Be it known that I, OSCAR R. CASSELL, a citizen of the United States, residing at New York, in the county of New York and State of New York, have invented new and useful Improvements in Angle-Indicators, of which the following is a specification.

This invention relates to indicating and registering devices and particularly to that class of devices which is adapted to indicate the angle of aerial craft.

The object of the invention is to provide a device of this character which will effectually indicate the different angles of an aeroplane or dirigible during its flight automatically and to register and indicate dangerous angles even though an accident may have happened.

In practice preferably two of these instruments are used on the aeroplane or like device, so that the aviator may determine the angle of the right or left wing or the front or rear of the machine without depending upon his sense of feeling.

Further objects of the invention will appear as the following specific description is read in connection with the accompanying drawings, which form a part hereof, and in which:—

Figure 1 is an elevation of the device with the parts in balance indicating position. Fig. 2 is a similar view showing the parts arranged in registering position after an abnormally erratic flight. Fig. 3 is a vertical section taken on the line 3—3 of Fig. 1. Fig. 4 is a detail side elevation of one of the indicating and registering pointers. Fig. 5 is an enlarged section through one end thereof.

Referring more particularly to the drawings, 1 represents a ring having suitable graduations 2 arranged around the circumference and extending in opposite directions 90° from the zero point 3. This ring is provided with attaching members 4 by which the device can be mounted in any position upon the machine and the inner side of the ring has formed therein a ballway 5 in which suitable balls 6 are mounted. The inner ring is shown at 7 and is also provided with a ballway 8 to receive the balls 6. This ring has extending across the same a rod or spoke 9 which is weighted, as shown at 10, and is provided with a pointer 11 overhanging the outer ring so as to point to the graduations thereon. The upper end of the spoke or rod 9 projects beyond the ring 7 and overlies the ring 1 and is provided with a spring pressed plunger 12 carried in a lateral head 13 and adapted to engage suitable apertures 14 formed in the rim 1, preferably at the 45° point.

The spoke 9 has mounted therein a laterally projecting stub shaft 15 upon which a plurality of pointers 16, 17 and 18 is journaled, each provided with a weight 19 at its lower end and each operated independently over graduated segments 20, 21 and 22 carried by a cross bar 23 secured to the outer ring. Each of the segments 20, 21 and 22 is provided with suitable graduations 24 and at the 60° point on the segment 20 a plurality of holes 25 is formed. Similar holes 26 are formed at the 70° points on the scale 21 and a single hole 27 is formed at each 90° point on the segment 22. The holes 25, 26 and 27 are arranged on opposite sides of the zero point 28 and each of the pointers 16, 17 and 18 is provided with a laterally extending head 29 having a spring pressed plunger 30 mounted therein to engage the apertures and lock the pointers in operative position.

In practice the ring 1 is firmly secured to the machine and assumes any position that the machine assumes in its flight or travel. The lower end of the spoke 9 being weighted normally keeps this spoke vertical and the pointer 11, hanging in the form of a pendulum, operates over the graduations upon the ring. If the machine is tilted forwardly, rearwardly or laterally in either direction to a dangerous angle, say 45°, the spring pressed plunger 12 upon the extension of the spoke 9 will engage the first aperture in the series 14. This action then locks the wheel to the ring 1 and registers the fact that the machine has been tilted to one side at an angle of 45°. The wheel 7 now being locked to the ring 1, the pointer 16 will begin to indicate the angle of position of the machine and if a 60° angle of inclination of the wings of the machine is reached in the same direction or in an opposite direction the plunger 30 on the pointer will engage one of the holes 25 so as to lock the pointer 16. When the pointer 16 is locked the arms 17 and 18 will be operated in a similar manner and the pointer 18 will indicate up to the 90° point at which time it will be locked in registering position. At this point the machine will probably have overturned and the registering device will only show the positions assumed by the machine in its flight after being picked up.

A suitable light 34 may be mounted upon the weight or table so that the scale may be read at night. The ring is shown as supplied with two legs 31 and 32, so that the same may be mounted upon a vessel to indicate the pitch thereof in a heavy sea.

In aeroplane work two of these indicators will be preferably used and their arrangement will be such that one will indicate the lateral tilting of the machine, while the other will be positioned to indicate the forward or rearward tilting.

Having thus described the invention, what I claim as new is:—

1. An angle indicator comprising a graduated supporting member, a plurality of graduated scales carried thereby, an indicating member having a pointer to operate over the graduations on the supporting member, means to automatically lock the indicating member against movement in either direction to the supporting member when the pointer reaches a predetermined graduation thereon, and a pointer carried by the indicating member and adapted to operate over the graduated scales when the member is locked to the supporting member.

2. An angle indicator comprising graduated supporting member, an indicating member rotatably mounted thereon and having a pointer to operate over the graduations, means to automatically lock the indicating member to the supporting member when the pointer reaches a predetermined point of graduation, a plurality of indicating scales carried by the supporting members, independent pointers for said scales, and means carried by each pointer and adapted to coöperate with the corresponding scale to automatically lock the pointers in succession as they reach predetermined graduation points, together with weights on the pointers.

In testimony whereof I affix my signature in presence of two witnesses.

OSCAR ROBT. CASSELL.

Witnesses:
EDWARD MONTGOMERY,
JOHN W. I. WHITE.

---

Copies of this patent may be obtained for five cents each, by addressing the "Commissioner of Patents, Washington, D. C."